United States Patent
Laroia et al.

(10) Patent No.: US 7,623,442 B2
(45) Date of Patent: Nov. 24, 2009

(54) SIGNALING METHOD IN AN OFDM MULTIPLE ACCESS SYSTEM

(75) Inventors: Rajiv Laroia, Basking Ridge, NJ (US); Junyi Li, Pine Brook, NJ (US); Sathyadev Venkata Uppala, Scotch Plains, NJ (US)

(73) Assignee: QUALCOMM Incorporated, San Diego, CA (US)

(*) Notice: Subject to any disclaimer, the term of this patent is extended or adjusted under 35 U.S.C. 154(b) by 703 days.

(21) Appl. No.: 11/186,490

(22) Filed: Jul. 20, 2005

(65) Prior Publication Data

US 2005/0254416 A1 Nov. 17, 2005

Related U.S. Application Data

(62) Division of application No. 09/805,887, filed on Mar. 15, 2001, now Pat. No. 7,295,509.

(60) Provisional application No. 60/230,937, filed on Sep. 13, 2000.

(51) Int. Cl.
*H04J 11/00* (2006.01)
*H04B 7/216* (2006.01)

(52) U.S. Cl. .................. 370/208; 370/335; 370/342

(58) Field of Classification Search .................. None
See application file for complete search history.

(56) References Cited

U.S. PATENT DOCUMENTS

| | | | |
|---|---|---|---|
| 4,393,276 A * | 7/1983 | Steele | 380/28 |
| 5,268,694 A | 12/1993 | Jan et al. | |
| 5,282,222 A | 1/1994 | Fattouche et al. | |
| 5,363,408 A | 11/1994 | Paik et al. | |
| 5,371,761 A | 12/1994 | Daffara et al. | |
| 5,384,810 A | 1/1995 | Amrany | |
| 5,406,551 A | 4/1995 | Saito et al. | |
| 5,410,538 A | 4/1995 | Roche et al. | |
| 5,455,839 A | 10/1995 | Eyuboglu | |
| 5,491,727 A | 2/1996 | Petit | |

(Continued)

FOREIGN PATENT DOCUMENTS

EP 0 786 889 A1 7/1997

(Continued)

OTHER PUBLICATIONS

J. M. Kappes and S. I. Sayegh, "Programmable Demultiplexer/Demodulator Processor", Comsat Laboratories, pp. 230-234.

(Continued)

*Primary Examiner*—Steven H Nguyen
(74) *Attorney, Agent, or Firm*—Milan I. Patel; Michael Straub

(57) ABSTRACT

A method for reducing the peak-to-average ratio in an OFDM communication signal is provided. The method includes defining a constellation having a plurality of symbols, defining a symbol duration for the OFDM communication signal, and defining a plurality of time instants in the symbol duration. A plurality of tones are allocated to a particular communication device, and a discrete signal is constructed in the time domain by mapping symbols from the constellation to the time instants. A continuous signal is generated by applying an interpolation function to the discrete signal such that the continuous signal only includes sinusoids having frequencies which are equal to the allocated tones.

32 Claims, 12 Drawing Sheets

U.S. PATENT DOCUMENTS

| | | | |
|---|---|---|---|
| 5,548,582 | A | 8/1996 | Brajal et al. |
| 5,612,978 | A | 3/1997 | Blanchard et al. |
| 5,732,113 | A | 3/1998 | Schmidl et al. |
| 5,815,488 | A | 9/1998 | Williams et al. |
| 5,822,368 | A | 10/1998 | Wang |
| 5,838,268 | A | 11/1998 | Frenkel |
| 5,867,478 | A | 2/1999 | Baum et al. |
| 5,887,023 | A | 3/1999 | Mabuchi |
| 5,907,585 | A * | 5/1999 | Suzuki et al. ............... 375/324 |
| 5,933,421 | A | 8/1999 | Alamouti et al. |
| 5,955,992 | A | 9/1999 | Shattil |
| 5,956,642 | A | 9/1999 | Larsson et al. |
| 6,038,263 | A | 3/2000 | Kotzin et al. |
| 6,038,450 | A | 3/2000 | Brink et al. |
| 6,061,337 | A | 5/2000 | Light et al. |
| 6,112,094 | A | 8/2000 | Dent |
| 6,175,550 | B1 | 1/2001 | Van Nee |
| 6,240,129 | B1 | 5/2001 | Reusens et al. |
| 6,335,922 | B1 | 1/2002 | Tiedemann, Jr. et al. |
| 6,337,983 | B1 | 1/2002 | Bonta et al. |
| 6,377,539 | B1 | 4/2002 | Kang et al. |
| 6,388,998 | B1 | 5/2002 | Kasturia |
| 6,466,800 | B1 | 10/2002 | Sydon et al. |
| 6,473,467 | B1 | 10/2002 | Wallace et al. |
| 6,519,462 | B1 | 2/2003 | Lu et al. |
| 6,563,881 | B1 | 5/2003 | Sakoda et al. |
| 6,577,739 | B1 * | 6/2003 | Hurtig et al. ............... 381/316 |
| 6,584,140 | B1 | 6/2003 | Lee |
| 6,597,746 | B1 | 7/2003 | Amrany et al. |
| 6,636,568 | B2 | 10/2003 | Kadous |
| 6,654,431 | B1 * | 11/2003 | Barton et al. ............... 375/346 |
| 6,657,949 | B1 | 12/2003 | Jones et al. |
| 6,674,810 | B1 | 1/2004 | Cheng |
| 6,678,318 | B1 | 1/2004 | Lai |
| 6,693,952 | B1 | 2/2004 | Chuah et al. |
| 6,717,908 | B2 | 4/2004 | Vijayan et al. |
| 6,751,444 | B1 | 6/2004 | Meiyappan |
| 6,763,009 | B1 | 7/2004 | Bedekar et al. |
| 6,778,513 | B2 | 8/2004 | Kasapi et al. |
| 6,850,481 | B2 | 2/2005 | Wu et al. |
| 6,862,271 | B2 | 3/2005 | Medvedev et al. |
| 6,870,826 | B1 | 3/2005 | Ishizu |
| 6,904,550 | B2 | 6/2005 | Sibecas et al. |
| 6,909,707 | B2 | 6/2005 | Rotstein et al. |
| 6,928,047 | B1 * | 8/2005 | Xia ............... 370/206 |
| 7,006,557 | B2 | 2/2006 | Subrahmanya et al. |
| 7,010,048 | B1 | 3/2006 | Shattil |
| 7,016,425 | B1 * | 3/2006 | Kraiem ............... 375/261 |
| 7,061,898 | B2 | 6/2006 | Hashem et al. |
| 7,069,009 | B2 | 6/2006 | Li et al. |
| 7,072,315 | B1 | 7/2006 | Liu et al. |
| 7,099,299 | B2 | 8/2006 | Liang et al. |
| 7,133,460 | B2 | 11/2006 | Bae et al. |
| 7,149,238 | B2 | 12/2006 | Agee et al. |
| 7,151,936 | B2 | 12/2006 | Wager et al. |
| 7,161,971 | B2 | 1/2007 | Tiedemann, Jr. et al. |
| 7,200,177 | B2 | 4/2007 | Miyoshi |
| 7,248,559 | B2 | 7/2007 | Ma et al. |
| 7,280,467 | B2 | 10/2007 | Smee, et al. |
| 7,313,086 | B2 | 12/2007 | Aizawa |
| 7,313,126 | B2 | 12/2007 | Yun et al. |
| 7,313,174 | B2 | 12/2007 | Alard et al. |
| 7,313,407 | B2 | 12/2007 | Shapira |
| 7,327,812 | B2 | 2/2008 | Auer |
| 7,366,520 | B2 | 4/2008 | Haustein et al. |
| 7,379,489 | B2 | 5/2008 | Zuniga et al. |
| 7,406,336 | B2 | 7/2008 | Astely et al |
| 7,418,043 | B2 | 8/2008 | Shattil |
| 2003/0072255 | A1 | 4/2003 | Ma et al. |
| 2004/0001429 | A1 | 1/2004 | Ma et al. |
| 2004/0032443 | A1 | 2/2004 | Moylan et al. |
| 2004/0166887 | A1 | 8/2004 | Laroia et al. |
| 2004/0190640 | A1 | 9/2004 | Dubuc et al. |
| 2004/0252629 | A1 | 12/2004 | Hasegawa et al. |
| 2004/0257979 | A1 | 12/2004 | Ro et al. |
| 2005/0073976 | A1 | 4/2005 | Fujii |
| 2005/0147024 | A1 | 7/2005 | Jung et al. |
| 2005/0243791 | A1 | 11/2005 | Park et al. |
| 2006/0002451 | A1 | 1/2006 | Fukuta et al. |
| 2006/0172704 | A1 | 8/2006 | Nishio et al. |
| 2007/0064669 | A1 | 3/2007 | Classon et al. |
| 2007/0177631 | A1 | 8/2007 | Popovic et al. |
| 2008/0181139 | A1 | 7/2008 | Rangarajan et al. |

FOREIGN PATENT DOCUMENTS

| | | |
|---|---|---|
| EP | 0 981 222 A2 | 2/2000 |
| EP | 1 091 516 A1 | 4/2001 |
| EP | 1148673 | 10/2001 |
| EP | 1187506 | 3/2002 |
| EP | 1445873 | 8/2004 |
| EP | 1542488 | 6/2005 |
| EP | 1601149 | 11/2005 |
| EP | 1643669 | 4/2006 |
| JP | 2000-332724 | 11/2000 |
| RU | 2216105 | 11/2003 |
| WO | 9800946 | 1/1998 |
| WO | WO/99/41871 | 8/1999 |
| WO | 9952250 | 10/1999 |
| WO | 02004936 | 1/2002 |
| WO | 0231991 | 4/2002 |
| WO | 02033848 | 4/2002 |
| WO | 2004008681 | 1/2004 |
| WO | 2004030238 | 4/2004 |
| WO | 2004032443 | 4/2004 |
| WO | 2004038972 | 5/2004 |
| WO | 2004051872 | 6/2004 |
| WO | 2004073276 | 8/2004 |
| WO | 2005015797 | 2/2005 |
| WO | 2006099545 | 9/2006 |
| WO | 2006099577 | 9/2006 |
| WO | 2006127544 | 11/2006 |
| WO | 2007024935 | 3/2007 |

OTHER PUBLICATIONS

Bingham, "Other Types of MCM", ADSL, VDSL, and Multicarrier Modulation, John Wiley & Sons, New York, XP-002199502, (2000), pp. 111-113.

Bahai, Saltzberg, "System Architecture", Multi-Carrier Digital Communications, Kluwer Academic, New York, XP-002199501, (1999), pp. 17-21.

Tellado, "Multicarrier Modulation with Low Par", Kluwer Academic, Dordrecht, NL XP-002199500, (2000), pp. 6-11 and 55-60.

C.R. Nassar, B. Natarajan and S. Shattil Introduction of Carrier Interference to Spread Spectrum Multiple Access Department of ECE, Colorado State Univewrsity, Fort Collins, Colorado, and Idris Communications, Boulder Colorodo.

Czylwik, "Comparison Between Adaptive OFDM and Single Carrier Modulation with Frequency Domain Equalization," IEEE 47th Vehicular Technology Conference, vol. 2, May 4-7, 1997. pp. 865-869.

Kaleh, "Channel Equalization for Block Transmission Systems," IEEE Journal on Selected Areas in Communications, vol. 13, No. 1, Jan. 1995, pp. 110-121.

Keller, et al., "Adaptive Multicarrier Modulation: A Convenient Framework for Time-Frequency Processing in Wireless Communications," Proceedings of the IEEE, vol. 88, No. 5, May 2000, pp. 611-640.

Lacroix, et al., "A Study of OFDM Parameters for High Data Rate Radio LAN's," 2000 IEEE 51st Vehicular Technology Conference Proceedings, vol. 2, May 15-18, 2000, pp. 1075-1079.

Lott, "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al., "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Sari, et al., "Transmission Techniques for Digital Terrestrial TV Broadcasting," IEEE Communications Magazine, Feb. 1995, pp. 100-109.

Schnell, et al, "Application of IFDMA to Mobile Radio Transmission," IEEE 1998 International Conference on Universal Personal Communications, vol. 2, Oct. 5-9, 1998, pp. 1267-1272.

Tellambura, "Use of m-sequences for OFDM Peak-to-Average Power Ratio Reduction," Electronics Letters, vol. 33, No. 15, Jul. 17, 1997, pp. 1300-1301.

Xiaodong, et al., "M-Sequences for OFDM Peak-to-Average Power Ratio Reduction and Error Correction," Electronics Letters, vol. 33, Issue 7, Mar. 27, 1997, pp. 554-555.

Zekri, et al., "DMT Signals with Low Peak-to-Average Power Ratio," Proceedings, IEEE International Symposium on Computers and Communications, 1999, Jul. 6-8 1999, pp. 362-368.

International Search Report - PCT/US01/028314, International Search Authority - European Patent Office, Jun. 5, 2002.

Chennakeshu, et al. "A Comparision of Diversity Schemes for a Mixed-Mode Slow Frequency-Hopped Cellular System," IEEE, 1993, pp. 1749-1753.

Chennakeshu, et al. "Capacity Analysis of a TDMA-Based Slow-Frequency -Hopped Cellular System," IEEE Transaction on Vehicular Technology, vol. 45., No. 3 Aug. 1996, pp. 531-542.

Chiani, et al. "Outage Evaluation for Slow Frequency-Hopping Mobile Radio Systems" IEEE Transactions on Communications, vol. 47, No. 12, pp. 1865-1874, Dec. 1999.

Choi, et al., "Design of the Optimum Pilot Pattern for Channel Estimation in OFDM Systems," Global Telecommunications Conference, IEEE Communications Society, pp. 3661-3665, Globecom, Dallas, Texas (2004).

Das, et-al. "On the Reverse Link Interference Structure for Next Generation Cellular Systems," European Microwave Conference, Oct. 11, 2004 (Oct. 11, 2004), pp. 3068-3072.

Dinis, et al, "A Multiple Access Scheme for the Uplink of Broadband Wireless Systems," IEEE Global Telecommunications Conference, 2004, Globecom '04, vol. 6, 29 Nov. 3 Dec. 2004, pp. 3808-3812.

Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, p.

Je, et al. "A Novel Multiple Access Scheme for Uplink Cellular Systems," IEEE Vehicular Technology Conference, Sep. 26, 2004 (Sep. 26, 2004) pp. 984-988.

Kim, et al. "Performance of TDMA System With SFH and 2-Bit Differentially Detected GMSK Over Rayleigh Fading Channel," IEEE Vehicular Technology Conference, Apr. 28, 1996 (Apr. 28, 1996), pp. 789-793.

Kishiyama Y et al; "Investigation of Optimum Pilot Channel Structure for VSF-OFCDM Broadband Wireless Access in Forward Link", IEEE Vehicular Technology Conference, New York, NY, US, vol. 4, pp. 139-144, Apr. 22, 2003.

Kostic, et al. "Fundamentals of Dynamic Frequency Hopping in Cellular Systems," IEEE Journal on Selected Areas in Communications, vol. 19, No. 11, Nov. 2001 pp. 2254-2266.

Kostic, et al. "Dynamic Frequency Hopping in Wireless Cellular Systems-Simulations of Full-Replacement and Reduced-Overhead Methods," IEEE Vehicular Technology Conference, May 16, 1999 (May 16, 1999), pp. 914-918.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.

Naofal Al-Dhahir: "A Bandwidth-Optimized Reduced-Complexity Equalized Multicarrier Transceiver", IEEE Transactions on Communications, vol. 45, No. 8, Aug. 1997.

Naofal Al-Dhahir: "Optimum Finite-Length Equalization for Multicarrier Transceivers", IEEE Trans. On. Comm., pp. 56-64, Jan. 1996.

Nassar, Carl R., et al., "High-Performance MC-CDMA via Carrier Interferometry Codes", IEEE Transactions on Vehicular Technology, vol. 50, No. 6, Nov. 2001.

Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.

Shattil et al.,"Array Control Systems for Multicarrier Protocols Using a Frequency-Shifted Feedback Cavity", IEEE, 1999.

Sklar: "Formatting and Baseband Transmission", Chapter 2, pp. 54, 104-106.

Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-105.

Torrieri, "Cellular Frequency-Hopping CDMA Systems," IEEE Vehicular Technology Conference, May 16, 1999 (May 16, 1999), pp. 919-925.

3rd Generation Partnership Project; Technical Specification Group Radio Access Network; Physical Layer Aspects for Evolved UTRA (Release 7), 3GPP TR 25.8.14 v0.3.1 (Nov. 2005).

International Preliminary Examination Report PCT/US01/028314, IPEA/US Apr. 23, 2003.

European Search Report - EP08012608 Search Authority - Munich Patent Office, Sep. 3, 2008.

Karsten Bruninghaus and Hermann Rohling, "Multi-Carrier Spread Spectrum and Its Relationship to Single-Carrier Transmission", Vehicular Technology Conference, 1998, VTC 98, 48th IEEE, vol. 3, May 18-21, 1998, pp. 2329-2332.

Hermann Rohling and Rainer Grunheid, "Performance Comparison of Different Multiple Access Schemes for the Downlink of an OFDM Communication System", Vehicular Technology Conference, 1997, 47th IEEE, vol. 3, May 4-7, 1997, pp. 1365-1369.

Written Opinion - PCT/US01/28314, International Preliminary Examining Authority/US, Apr. 4, 2003.

* cited by examiner

○ Constellation used by $C_{2k-1}$

× Constellation used by $C_{2k}$

Imaginary components cyclically *offset*

Cyclic prefix is added after cyclically shifting — 24

SIGNALING METHOD IN AN OFDM MULTIPLE ACCESS SYSTEM

CROSS-REFERENCE TO RELATED APPLICATIONS

This application is a divisional of U.S. patent application Ser. No. 09/805,887, filed on Mar. 15, 2001 now U.S. Pat. No. 7,295,509 and titled "SIGNALING METHOD IN AN OFDM MULTIPLE ACCESS SYSTEM," which claims priority to U.S. Provisional Application No. 60/230,937, filed on September 13, 2000, and titled "SIGNALING METHOD IN AN OFDM MULTIPLE ACCESS WIRELESS SYSTEM," which is incorporated by reference.

TECHNICAL FIELD

This invention relates to an orthogonal frequency division multiplexing (OFDM) communication system, and more particularly to an OFDM communication system for a multiple access communication network.

BACKGROUND

Orthogonal frequency division multiplexing (OFDM) is a relatively well known multiplexing technique for communication systems. OFDM communication systems can be used to provide multiple access communication, where different users are allocated different orthogonal tones within a frequency bandwidth to transmit data at the same time. In an OFDM communication system, the entire bandwidth allocated to the system is divided into orthogonal tones. In particular, for a given symbol duration T available for user data transmission, and a given bandwidth W, the number of available orthogonal tones F is given by WT. The spacing between the orthogonal tones $\Delta$ is chosen to be 1/T, thereby making the tones orthogonal. In addition to the symbol duration T which is available for user data transmission, an additional period of time $T_c$ can be used for transmission of a cyclic prefix. The cyclic prefix is prepended to each symbol duration T and is used to compensate for the dispersion introduced by the channel response and by the pulse shaping filter used at the transmitter. Thus, although a total symbol duration of $T+T_c$ is employed for transmitting an OFDM symbol, only the symbol duration T is available for user data transmission and is therefore called an OFDM symbol duration.

In prior OFDM techniques, an OFDM signal is first constructed in the frequency domain by mapping symbols of a constellation to prescribed frequency tones. The signal constructed in the frequency domain is then transformed to the time domain by an inverse discrete Fourier transform (IDFT) or inverse fast Fourier transform (IFFT) to obtain the digital signal samples to be transmitted. In general, symbols of the constellation have a relatively low peak-to-average ratio property. For example, symbols of a QPSK constellation all have the same amplitude. However, after being transformed by the IDFT or IFFT, the resultant time domain signal samples are the weighted sum of all the symbols, and therefore generally do not preserve the desirable low peak-to-average ratio property. In particular, the resulting time domain signal typically has a high peak-to-average ratio.

Existing techniques for implementing OFDM communication systems can be highly inefficient due to the relatively high peak-to-average ratio when compared with other signaling schemes, such as single carrier modulation schemes. As a result, existing OFDM techniques are not well suited for a wireless multiple access communication network with highly mobile users because the high peak-to-average ratio of the transmitted signal requires a large amount of power at the base station and at the wireless device. The large power requirements result in short battery life and more expensive power amplifiers for handheld wireless communication devices or terminals. Accordingly, it is desirable to provide an OFDM technique which reduces the peak-to-average ratio of the signal to be transmitted, while simultaneously taking advantage of the larger communication bandwidth offered by an OFDM communication system.

SUMMARY

In one aspect of the communication system, power consumption associated with generating and transmitting OFDM signals is reduced as compared to the prior OFDM systems discussed above. The OFDM signaling method includes defining a constellation having a plurality of symbols, defining the symbol duration for the OFDM communication signal, and defining a plurality of time instants in the symbol duration. In a given symbol duration, a plurality of tones in the symbol duration are allocated to a particular transmitter and the signal to be transmitted is represented by a vector of data symbols from the symbol constellation. The symbols are first directly mapped to the prescribed time instants in the symbol duration. A continuous signal is then constructed by applying continuous interpolation functions to the mapped symbols such that the values of the continuous signal at the prescribed time instants are respectively equal to the mapped symbols and the frequency response of the continuous signal only contains sinusoids at the allocated tones. Finally the digital signal, which is to be transmitted, consists of samples of the continuous signal. Alternatively, the digital signal can be generated directly by applying discrete interpolation functions to the mapped symbols. As symbols from the constellation generally have good peak-to-average ratio property, proper choices of allocated frequency tones, prescribed time instants and interpolation functions can result in a minimized peak-to-average ratio of the continuous function and the digital signal samples.

In one implementation the method of directly generating the digital signal samples is to multiply the symbol vector consisting of symbols to be transmitted with a constant matrix, where the constant matrix is determined by the allocated frequency tones and the prescribed time instants. The matrix can be precomputed and stored in a memory.

In one aspect, a transmitter associated with the communication system is allocated a number of contiguous tones and the prescribed time instants are equally-spaced time instants over the entire OFDM symbol duration.

In another aspect, the transmitter is allocated a number of equally-spaced tones and the prescribed time instants are equally-spaced time instants over a fraction of the OFDM symbol duration.

In the above aspects, in addition to the general method, the digital signal samples can be constructed by expanding the mapped symbols to a prescribed set of time instants from minus infinity to plus infinity and interpolating the expanded set of the mapped symbols with a sinc function. Equivalently, the digital signal samples can also be generated by a series of operations including discrete Fourier transformation, zero insertion, and inverse discrete Fourier transformation.

To further reduce the peak-to-average ratio of the digital signal samples obtained through interpolation, when symbols of the constellation are mapped to the prescribed time instants, the constellations used by two adjacent time instants are offset by $\pi/4$.

In another aspect of the system, the real and the imaginary components of the resultant digital sample vector are cyclically offset before the cyclic prefix is added. In yet another aspect of the communication system, the intended transmitter is allocated more tones than the number of symbols to be transmitted. Symbols of the constellation are directly mapped to prescribed equally-spaced time instants. The digital signal samples are constructed by expanding the mapped symbols to a prescribed set of time instants from minus infinity to plus infinity and interpolating the expanded set of the mapped symbols with a function whose Fourier transformation satisfies the Nyquist zero intersymbol interference criterion, such as raised, cosine functions. The digital signal samples can also be generated by a series of operations including discrete Fourier transformation, windowing, and inverse discrete Fourier transformation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
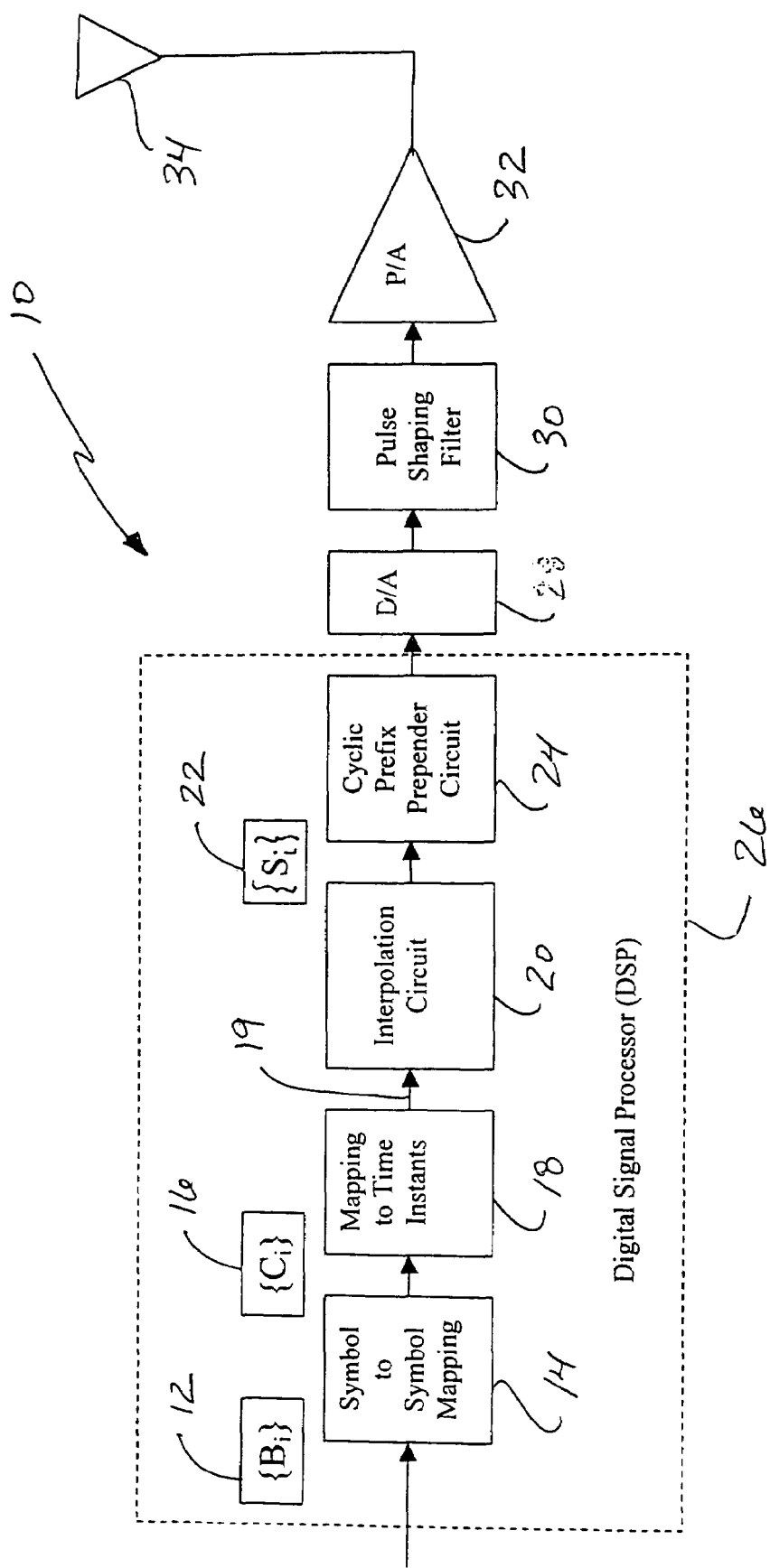
FIG. 1 is a block diagram of an OFDM system.

Referring to FIG. 1, an orthogonal frequency division multiplexing (OFDM) communication system 10 is shown. OFDM communication system 10 receives a first constellation of symbols $\{B_i\}$ 12 and provides the symbols to a symbol-to-symbol mapping circuit 14, that produces a second constellation of complex symbols $\{C_i\}$ 16. The complex symbols 16 represent data or a stream of data to be transmitted by the OFDM communication system, and may be chosen from a variety of symbol constellations including, but not limited to phase shift keying (PSK) and quadrature amplitude modulation (QAM) symbol constellations. The symbol-to-symbol mapping performed by the mapping circuit 14 is an optional step performed by the OFDM communication system 10.

Next, a time instant mapping circuit 18 maps each complex symbol 16 to a prescribed time instant within a given OFDM symbol duration. The mapping operation is performed in the time domain such that the mapping circuit 18 generates a discrete signal of mapped symbols within the time domain symbol duration. The output of the mapping circuit 18 is provided to an interpolation circuit 20, that produces a series of digital signal samples $\{S_i\}$ 22. The digital signal samples 22 are formed by sampling a continuous signal, which is constructed by applying one or more predetermined continuous interpolation functions to the mapped complex symbols 19. Alternatively, the digital signal samples 22 are formed by directly applying one or more predetermined discrete interpolation functions to the mapped complex symbols 19. When using the technique of applying discrete interpolation functions, no intermediate continuous signal is generated and the step of sampling the continuous signal is not necessary. The operation of the interpolation circuit 20 is described in greater detail below. A cyclic prefix circuit 24 receives the series of digital signal samples 22 from the interpolation circuit 20 and prepends a cyclic prefix to the digital signal samples 22. The cyclic prefix circuit 24 operates to copy and prepend the last portion of the digital signal sample vector S 22 to the beginning of the OFDM symbol duration. The resulting digital signal samples 22 with the prepended cyclic prefix are converted to an analog signal by a digital to analog converter 28. The resulting analog signal is further processed by a pulse shaping filter 30, the output of which is modulated to a carrier frequency, and amplified by a power amplifier unit 32 for transmission through an antenna 34.

In one implementation of the OFDM communication system 10, the symbol-to-symbol mapping circuit 14, the time instant mapping circuit 18, the interpolation circuit 20, and the cyclic prefix circuit 24 are implemented in a digital signal processor (DSP) 26, and may include a combination of hardware modules and/or software modules. These circuits 14, 18, 20, and 24 can also be implemented as separate discrete circuits within the OFDM communication system 10.

Figure 2A:
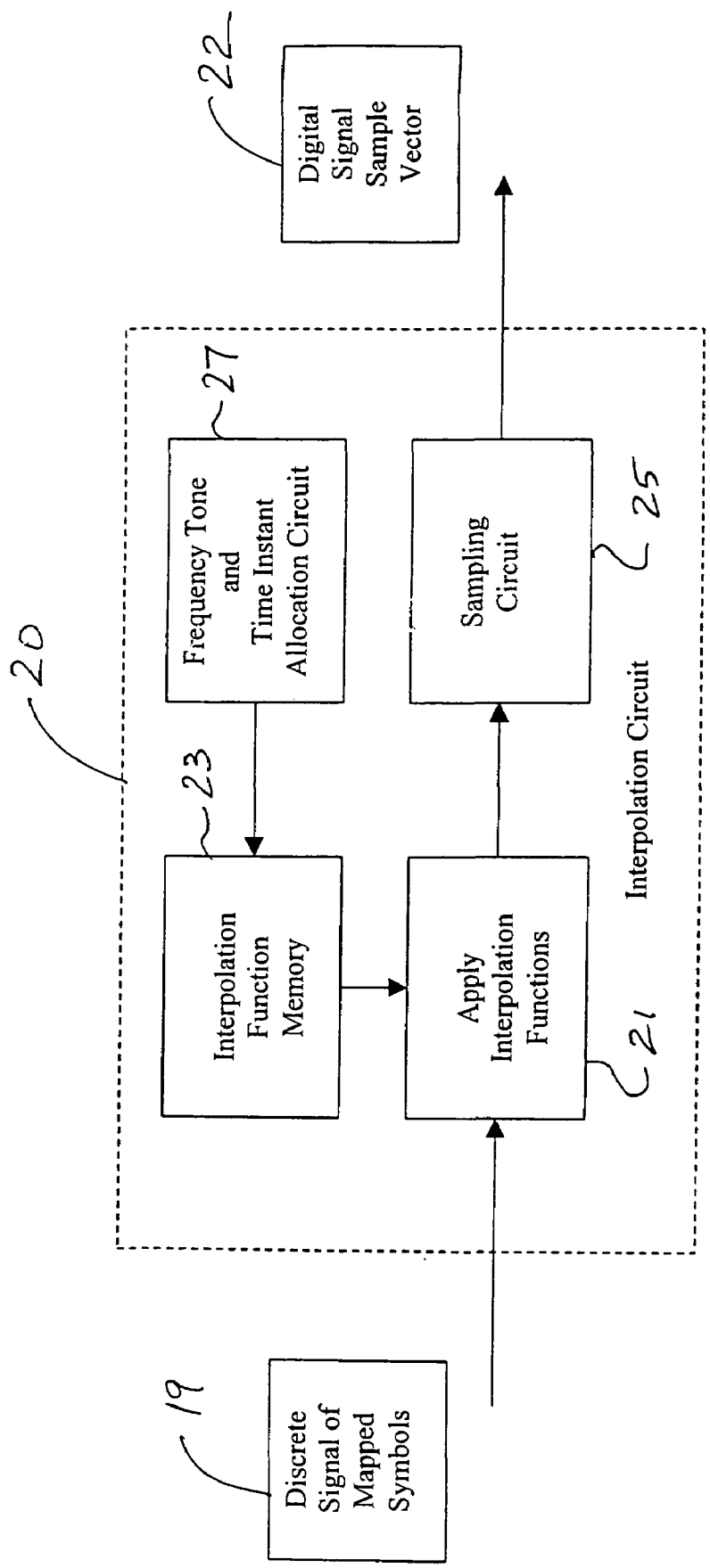
FIG. 2A is a block diagram of an interpolation system used by the OFDM system of FIG. 1.

The details of the interpolation circuit 20 are shown in FIG. 2A. The interpolation circuit 20 includes an interpolation function module 21 that applies one or more continuous interpolation functions to the discrete signal of mapped symbols 19 to generate a continuous signal in which signal variation between adjacent symbols is minimized. Thus, the continuous signal has a low peak-to-average ratio. The interpolation functions may be precomputed and stored in an interpolation function memory 23 connected to the interpolation function module 21. A frequency tone and time instant allocation circuit 27 is connected to the interpolation function memory 23 and defines an allocated tone set selected from frequency tones distributed over a predetermined bandwidth associated with the OFDM communication system 10. The allocated tone set is then provided to the interpolation function memory 23. The frequency tone and time instant allocation circuit 27 also defines the prescribed time instants distributed over the time domain symbol duration, which can also be stored in the interpolation function memory 23 for use by the interpolation function module 21 as well as other modules within the DSP 26. The interpolation circuit 20 also includes a sampling circuit 25 for receiving and sampling the continuous signal at discrete time instants distributed over the time domain symbol duration to generate the vector of digital signal samples 22. Alternatively, in FIG. 2B the interpolation function module 21 applies one or more discrete interpolation functions to the discrete signal of mapped symbols 19 to directly generate the digital signal sample vector 22, in which case the sampling circuit 25 (of FIG. 2A) is not needed. Through applying the discrete interpolation functions, the interpolation function module 21 effectively combines the processing steps of applying the continuous interpolation functions and sampling the intermediate continuous signal.

Figure 3A:
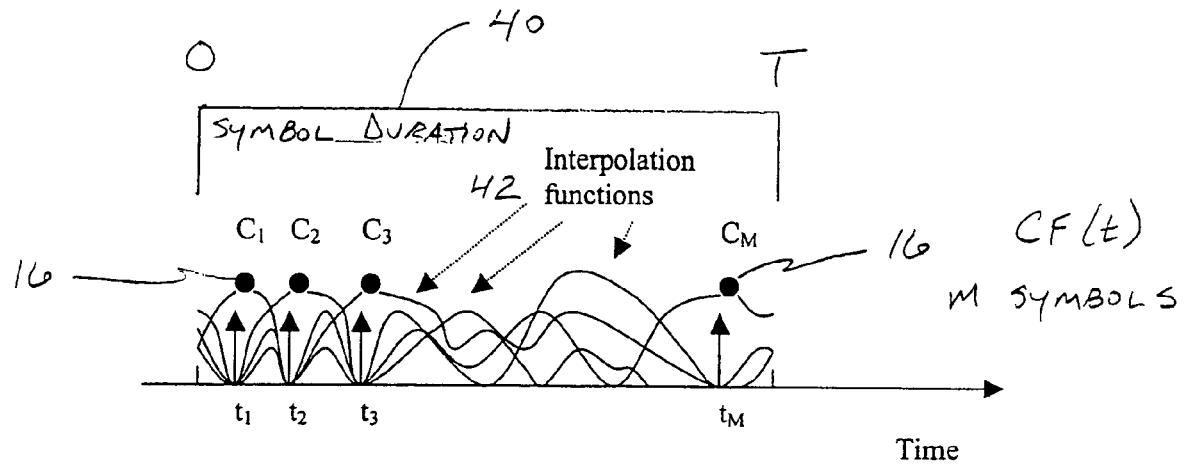
FIG. 3A is a graph showing symbols mapped to prescribed time instants in the time domain according to the OFDM technique implemented by the system of FIG. 1.

FIG. 3A graphically depicts the signal processing steps performed by the various circuits of the DSP 26. More specifically, FIG. 3A shows the construction of the signal to be transmitted in a given OFDM time domain symbol duration 40. The time domain symbol duration 40 is a time interval from 0 to T. For purposes of the following description, the OFDM symbol duration T does not include the cyclic prefix. The signal to be transmitted in the symbol duration 40 is represented by complex symbols $C_1, C_2, C_3, \ldots, C_M$ 16 that are mapped to the prescribed time instants, where M denotes the number of symbols to be transmitted in the symbol duration 40.

In one implementation, the OFDM communication system 10 is a multiple access communication system where the entire bandwidth available to all transmitters within the system is divided into F orthogonal frequency tones, $f_1, f_2, \ldots, f_F$. In the given symbol duration 40, a particular transmitter operating within a multiple access communication system is allocated M frequency tones $f_{i(1)}, f_{i(2)}, \ldots, f_{i(M)}$, which is a subset of, $f_1, f_2, \ldots, f_F$, (the total number of frequency tones) in order to transmit the signal. As part of this implementation, the number of tones allocated to a particular transmitter is equal to the number of symbols to be transmitted by that transmitter. Later in FIG. 8A, the number of allocated tones can be greater than the number of symbols to be transmitted. The remaining frequency tones can be used by other transmitters within the communication system. This technique allows OFDM communication system 10 to operate as a multiple access communication system.

The complex data symbols $C_1, C_2, C_3, \ldots, C_M$ 16 are first mapped to $t_1, t_2, t_3, \ldots, t_M$, respectively, where $t_1, t_2, t_3, \ldots, t_M$ are M prescribed time instants within the time domain symbol duration 40. The mapping operation generates a discrete signal of mapped symbols. It should be noted that the number of prescribed time instants is equal to the number of symbols M to be transmitted. As described above, the symbol mapping occurs in the time domain. Continuous interpolation functions 42 are then applied to the discrete signal of mapped symbols 16 to generate a continuous function CF(t) for t in the time interval from 0 to T.

The interpolation functions 42 are constructed such that the values of the continuous function CF(t) at time instants $t_1, t_2, t_3, \ldots, t_M$ are respectively equal to $C_1, C_2, C_3, \ldots, C_M$ and the frequency response of the continuous function CF(t) contains only sinusoids at the allocated tones. Therefore, CF(t) is constructed as $$CF(t) = \sum_{k=1}^{M} A_k e^{J2\pi f_{i(k)} t}$$

where $J=\sqrt{-1}$ and coefficients $A_k$ are given by $$\begin{bmatrix} A_1 \\ \vdots \\ A_M \end{bmatrix} = \begin{bmatrix} e^{J2\pi f_{i(1)} t_1} & \cdots & e^{J2\pi f_{i(M)} t_1} \\ \vdots & & \vdots \\ e^{J2\pi f_{i(1)} t_M} & \cdots & e^{J2\pi f_{i(M)} t_M} \end{bmatrix}^{-1} \begin{bmatrix} C_1 \\ \vdots \\ C_M \end{bmatrix}$$

Thus, each coefficient $A_k$ is generated by multiplying a matrix of predetermined sinusoids with the single column of data symbols $C_1, C_2, C_3, \ldots, C_M$ 16.

Figure 3B:
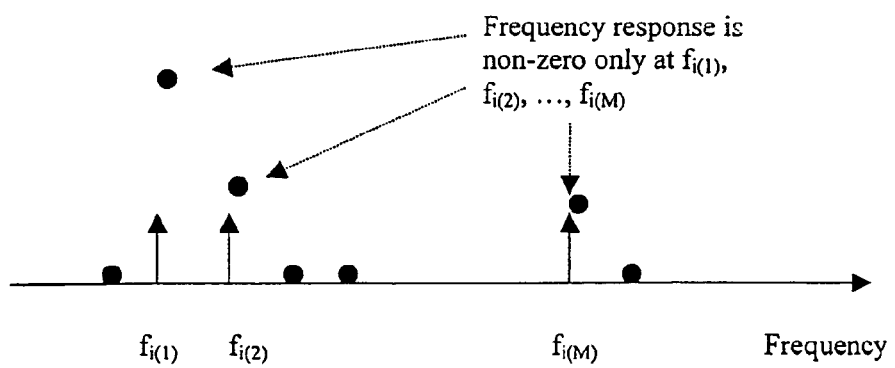
FIG. 3B is a graph showing the frequency domain response of the graph of FIG. 3B.

FIG. 3B shows the frequency response of the continuous function CF(t). More specifically, FIG. 3B shows that the frequency response of the continuous function is non-zero only at the allocated frequency tones $f_{i(1)}, f_{i(2)}, \ldots, f_{i(M)}$, and is zero at all other frequency tones.

The output of the DSP 26 is a vector of digital signal samples S 22, which are the samples of the continuous function CF(t) at discrete time instants 0, T/N, 2T/N, ..., T(N−1)/N, that is, $S_1$=CF(0), $S_2$=CF(T/N), $S_3$=CF(2T/N), ..., $S_N$=CF(T(N−1)/N), where N is the number of discrete time instants in the vector of digital signal samples 22. In a general form, $t_1, \ldots, t_M$ may not necessarily be equal to any of the time instants 0, T/N, 2T/N ..., T(N−1)/N. Therefore, while the digital signal samples S 22 may occur at the time instants $t_1, \ldots, t_M$, the OFDM communication system 10 does not require that the time instants 0, T/N, 2T/N, ..., T(N−1)/N be equal to $t_1, \ldots, t_M$.

In another implementation of OFDM communication system 10, the digital signal samples S 22 may be generated by the DSP 26 by directly multiplying a matrix of precomputed sinusoidal waveforms Z, operating as discrete interpolation functions, with the discrete signal of mapped symbols C in order to satisfy the transformation function S=ZC according to the following:

$$S = \begin{bmatrix} S_1 \\ \vdots \\ S_N \end{bmatrix}$$

Figure 2B:
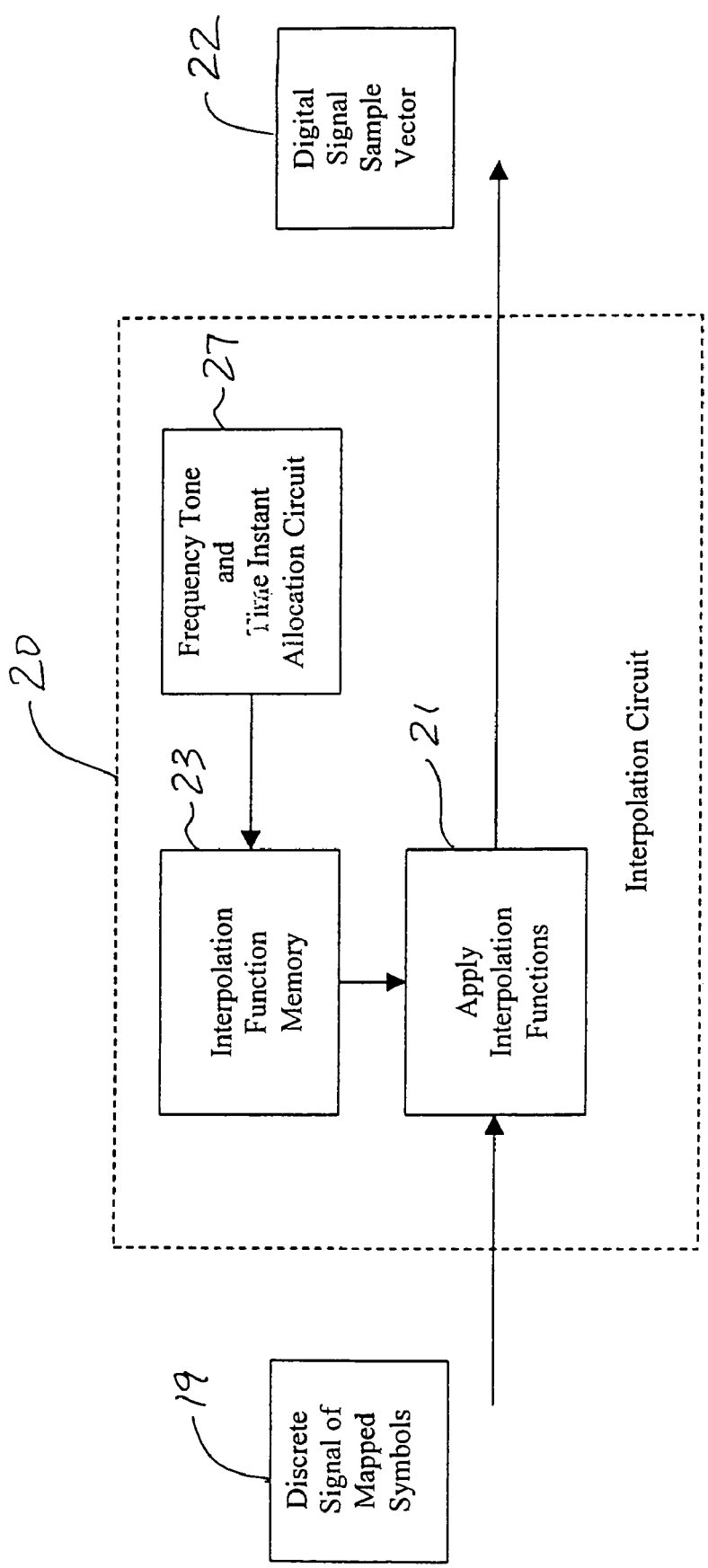
FIG. 2B is a block diagram of another interpolation system used by the OFDM system of FIG. 1.

-continued $$= \begin{bmatrix} e^{j2\pi f_{i(1)}0} & \cdots & e^{j2\pi f_{i(M)}0} \\ \vdots & & \vdots \\ e^{j2\pi f_{i(1)}T\frac{N-1}{N}} & \cdots & e^{j2\pi f_{i(M)}T\frac{N-1}{N}} \end{bmatrix} \begin{bmatrix} A_1 \\ \vdots \\ A_M \end{bmatrix}$$

$$= \begin{bmatrix} e^{j2\pi f_{i(1)}0} & \cdots & e^{j2\pi f_{i(M)}0} \\ \vdots & & \vdots \\ e^{j2\pi f_{i(1)}T\frac{N-1}{N}} & \cdots & e^{j2\pi f_{i(M)}T\frac{N-1}{N}} \end{bmatrix} \begin{bmatrix} e^{j2\pi f_{i(1)}t_1} & \cdots & e^{j2\pi f_{i(M)}t_1} \\ \vdots & & \vdots \\ e^{j2\pi f_{i(1)}t_M} & \cdots & e^{j2\pi f_{i(M)}t_M} \end{bmatrix}^{-1} \begin{bmatrix} C_1 \\ \vdots \\ C_M \end{bmatrix}$$

$$= ZC$$

where C represents the symbol vector, and the matrix Z represents the product of the two matrices in the second line of the above equation. Each column (i) of matrix Z represents the interpolation function 42 of a corresponding symbol $C_i$ to generate the digital signal samples S 22. As such, the matrix Z can be pre-computed and stored in the interpolation function memory 23 of the interpolation circuit 20 (FIG. 2B). The interpolation circuit 20 then applies the discrete interpolation functions 42 defined by the matrix Z to the discrete signal of mapped complex symbols C 16 in order to satisfy the criteria of S=ZC and to generate the vector of digital signal samples 22.

The purpose of constructing the signal in the time domain is to directly map the symbols 16, which have a desirable low peak-to-average ratio property, to the prescribed time instants within the symbol duration 40. Appropriate interpolation functions 42 are selected to obtain the continuous function CF(t) and the digital signal samples 22 such that the desirable low peak-to-average ratio property of the symbols 16 is substantially preserved for the continuous function and for the digital signal samples 22. The peak-to-average ratio property of the resulting (interpolated) continuous function CF(t) and the digital signal samples 22 is dependent upon the interpolation functions 42, the choice of allocated frequency tones $f_{i(1)}, f_{i(2)}, \ldots, f_{i(M)}$ from the set of tones, and the prescribed time instants $t_1, \ldots, t_M$.

Figure 4A:
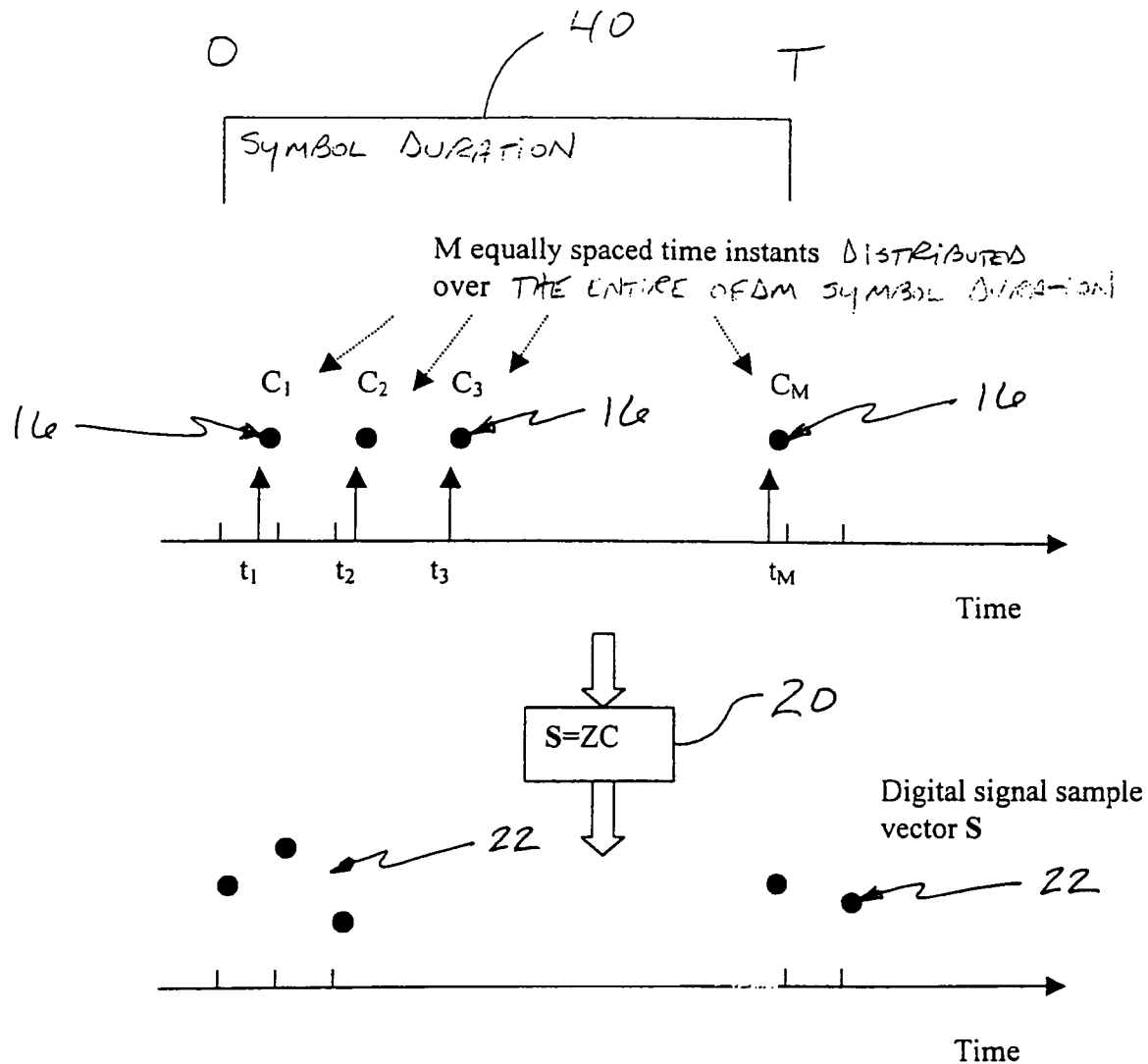
FIG. 4A shows an implementation technique for producing a digital signal sample vector using time domain symbol mapping in the case where the allocated tones are contiguous.

Referring to FIG. 4A, one implementation of the OFDM communication system 10 allocates tones $f_{i(1)}, f_{i(2)}, \ldots, f_{i(M)}$ to the transmitter associated with the communication system that are a subset of contiguous tones in the tone set $f_1, f_2, \ldots, f_F$. Therefore, $f_{i(k)}=f_0+(k-1)\Delta$, for k=1, ..., M, where M is the number of symbols. If the OFDM communication system 10 is a multiple access system, each transmitter associated with the communication system is allocated a non-overlapping subset of frequency tones. For purposes of description, let $f_0=0$. The construction for the other cases where $f_0 \neq 0$ can be similarly obtained.

Complex symbols $C_1, \ldots, C_M$ 16 are mapped in the time domain to the following time instants $t_k=(k-1)T/M$, for k=1, ..., M. As part of this implementation, the prescribed time instants $t_1, \ldots, t_M$ are equally-spaced time instants uniformly distributed over the entire OFDM symbol duration 40 as shown in the first time domain graph of FIG. 4A. Given the choice of the allocated frequency tones and prescribed time instants, the matrix Z, which is used to generate the digital signal samples S as discussed in FIGS. 3A-3B, can be simplified to $$Z = \frac{1}{M} \begin{bmatrix} e^{j2\pi f_{i(1)}0} & \cdots & e^{j2\pi f_{i(M)}0} \\ \vdots & & \vdots \\ e^{j2\pi f_{i(1)}T\frac{N-1}{N}} & \cdots & e^{j2\pi f_{i(M)}T\frac{N-1}{N}} \end{bmatrix} \begin{bmatrix} e^{-j2\pi f_{i(1)}t_1} & \cdots & e^{-j2\pi f_{i(1)}t_M} \\ \vdots & & \vdots \\ e^{-j2\pi f_{i(M)}t_1} & \cdots & e^{-j2\pi f_{i(M)}t_M} \end{bmatrix}.$$

The second time domain graph of FIG. 4A shows the resulting digital signal sample vector S 22 after the interpolation circuit 20 applies the interpolation functions 42 defined by the matrix Z to the complex symbols 16 according to the expression S=ZC. As part of this implementation, the sampling module 25 is not generally used as the digital signal sample vector S 22 is directly generated from the discrete signal of mapped symbols using the transformation function S=ZC.

Figure 4B:
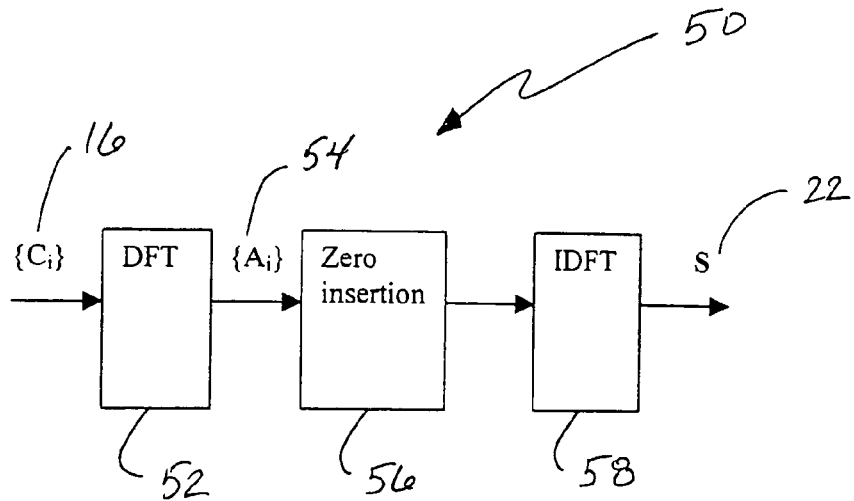
FIG. 4B is a block diagram showing a communication system for producing a digital signal sample vector in the case where the allocated frequency tones are contiguous.

Turning to FIG. 4B, a digital processing system 50 provides another technique for obtaining the vector of digital signal samples S. A DFT circuit 52 receives a discrete signal of complex data symbols $C_i$ and calculates the frequency responses $A_1, \ldots, A_M$, at tones $f_{i(1)}, f_{i(2)}, \ldots, f_{i(M)}$, through an M-point discrete Fourier transform (DFT). The vector $[A_1, \ldots, A_M]$ 54 output by the DFT circuit 52 is then expanded to a new vector of length N (the total number of time instants in the discrete signal vector S) by zero insertion at block 56. More specifically, this process involves putting the $k^{th}$ symbol $A_k$ to the $i(k)^{th}$ element of the new vector, for k=1, ..., M, where $f_{i(k)}$ is the $k^{th}$ tone allocated to the transmitter, and inserting zeros in all the remaining elements. Finally, an IDFT circuit 58 performs an N-point inverse discrete Fourier transform on the resulting vector (after zero insertion) to obtain the digital signal sample vector S. The collective procedure of DFT, zero insertion and IDFT is one way of implementing the discrete interpolation functions.

Figure 4C:
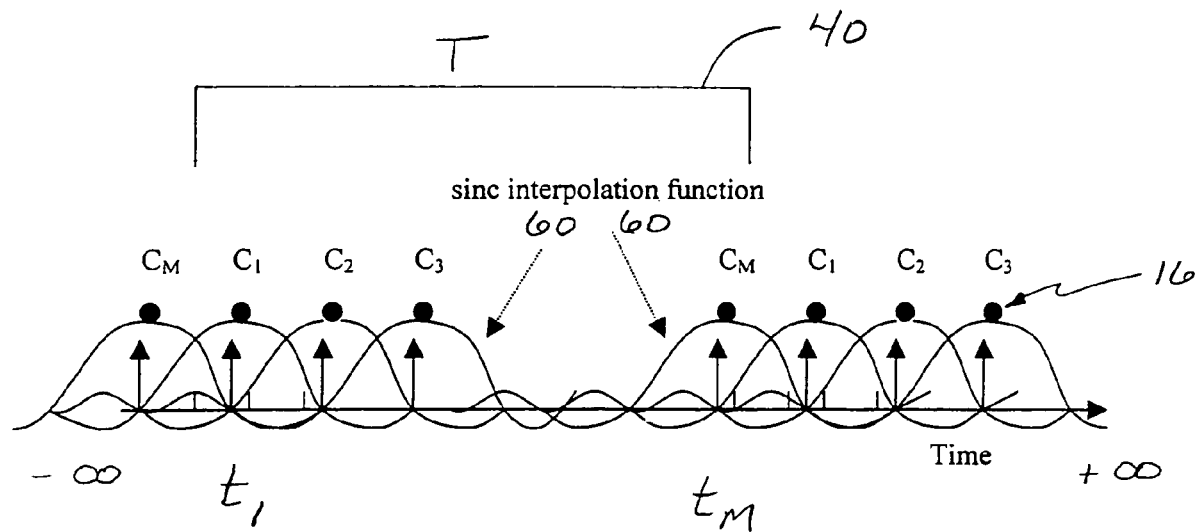
FIG. 4C is a graph showing the mapping of the symbols to the prescribed time instants, the expansion of the mapped symbols, and the use of a sinc function to interpolate the expanded symbols.

Turning to FIG. 4C, another technique for obtaining the digital signal samples S is shown. For simplicity of description, it is assumed that the allocated contiguous tones $f_{i(1)}, f_{i(2)}, \ldots, f_{i(M)}$ are centered at frequency 0. The construction for the other cases where the allocated tones are not centered at frequency 0 can be similarly obtained. As with FIG. 4A, the prescribed time instants $t_1, \ldots, t_M$ are equally-spaced time instants uniformly distributed over the entire OFDM symbol duration 40.

The complex symbols $C_1, \ldots, C_M$ are first mapped in the time domain to time instants $t_1, \ldots, t_M$ respectively. Next, the mapped symbols $C_1, \ldots, C_M$ are leftwards and rightwards shifted and replicated to an expanded set of prescribed time instants, which is a superset of $t_1, t_M$ and consists of an infinite number of equally-spaced time instants covering the time interval from $-\infty$ to $+\infty$. This technique creates an infinite series of mapped symbols C. The continuous function CF(t) is then constructed by interpolating the infinite series of mapped symbols using a sinc interpolation function 60. Mathematically, the above steps construct the continuous function CF(t)-as $$CF(t) = \sum_{i=1}^{M} \left\{ C_i \sum_{k=-\infty}^{\infty} \operatorname{sinc}\left(t - t_i - kT, \frac{T}{M}\right) \right\}.$$

where $\operatorname{sinc}(a,b)=\sin(\pi a/b)/(\pi a/b)$. The sinc interpolation function 60 can also be precomputed and stored in the interpolation function memory 23. As discussed in FIG. 3A the digital signal samples S 22 are the samples of the continuous function CF(t) at time instants 0, T/N, ..., T(N−1)/N. In FIGS. 4A-4C, if N is a multiple of M, then $S_{1+(k-1)N/M}=C_k$, for k=1, ..., M. It should be noted that the continuous function CF(t) only applies to the symbol duration 40 from 0 to T. The use of time interval from to −∞ to +∞ is solely for the purpose of mathematically constructing CF(t). The discrete interpolation functions, which combine the continuous interpolation functions and the sampling function, can be derived easily from the above description.

Figure 4D:
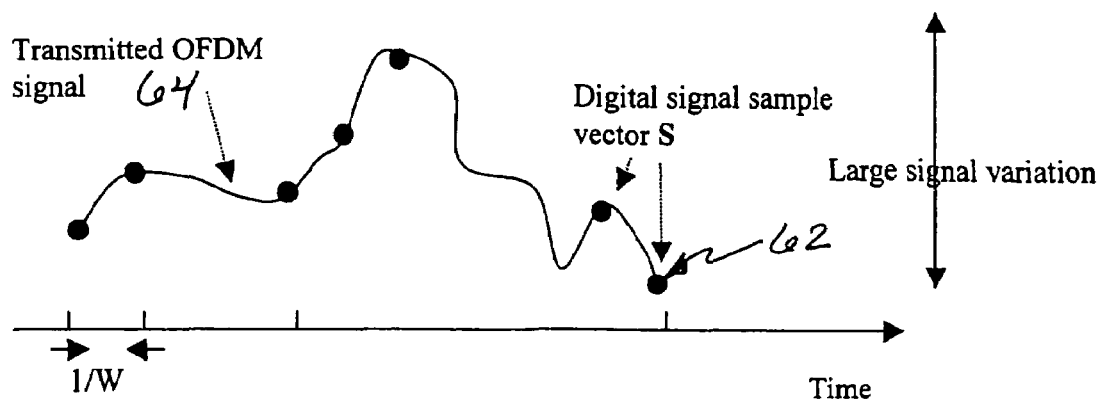
FIG. 4D is a graph showing the large peak-to-average ratio of the resulting digital signal sample vector when the symbols are mapped in the frequency domain in the prior OFDM systems.

For comparison purposes, FIG. 4D illustrates the resulting peak-to-average ratio for a digital signal sample vector S 62 and its associated transmitted OFDM signal 64 produced by symbols 16 where the signal is constructed in the frequency domain. As described above, this known technique, of mapping the symbols 16 in the frequency domain produces a large signal variation in the transmitted OFDM signal 64 and results in a large peak-to-average ratio.

Figure 4E:
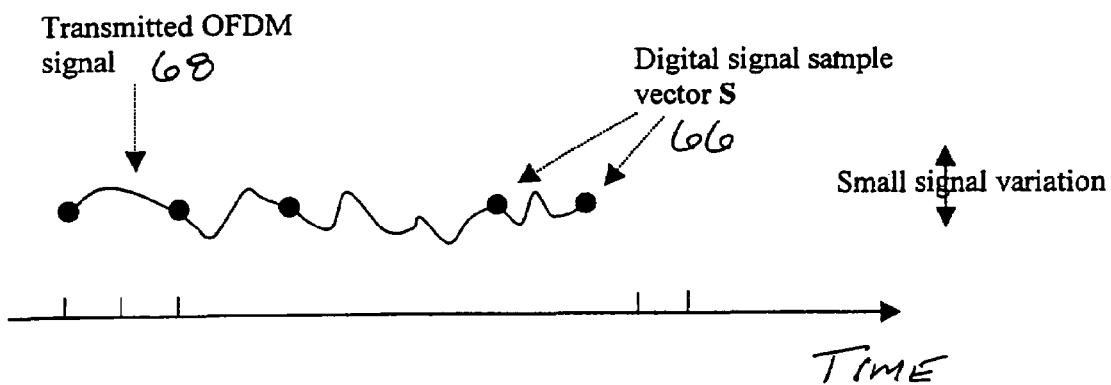
FIG. 4E is a graph showing the reduced peak-to-average ratio of the resulting digital signal sample vector when the symbols are mapped in the time domain using the technique of FIGS. 4A-4C.

FIG. 4E illustrates the resulting small signal variation and low peak-to-average ratio of the digital signal sample vector S 66 associated with the transmitted OFDM signal 68. As will be appreciated by comparing FIGS. 4D and 4E, mapping the constellation of complex symbols 16 in the time domain produces an OFDM signal 68 having a significantly reduced peak-to-average ratio.

Figure 5D:
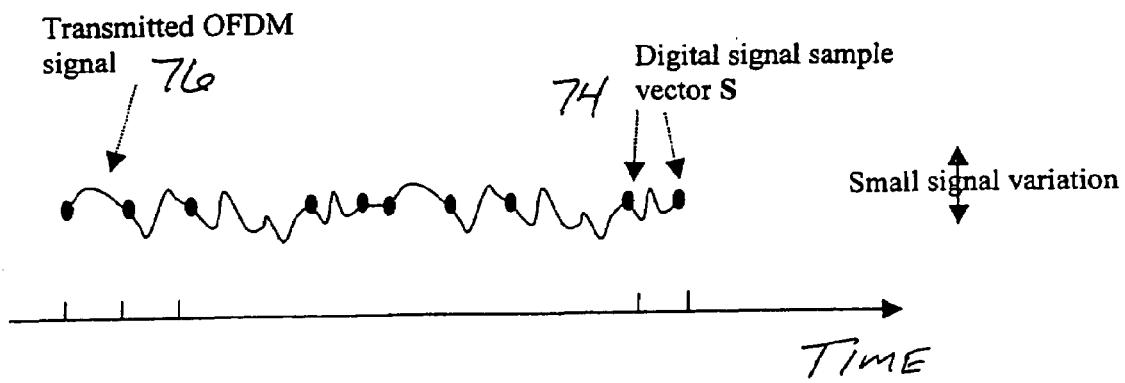
FIG. 5D is a graph showing the reduced peak-to-average ratio of the resulting digital signal sample vector when the symbols are mapped in the time domain using the technique of FIGS. 5A-5C.
Figure 5A:
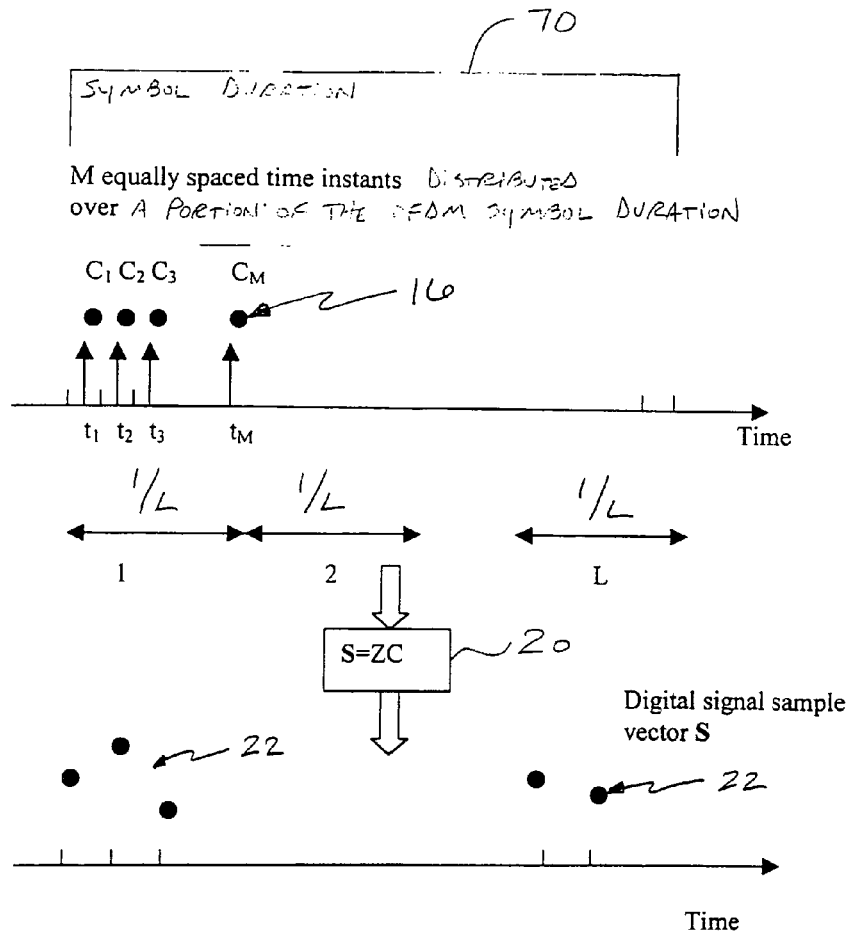
FIG. 5A shows another implementation technique for producing the digital signal sample vector using time domain symbol mapping in the case where the allocated tones are equally spaced in frequency.

FIG. 5A shows a second implementation of the OFDM communication system 10, and serves to further generalize the system shown in FIGS. 4A-4C. As part of OFDM system 10, tones, $f_{i(1)}, f_{i(2)}, \ldots, f_{i(M)}$, allocated to the transmitter associated with the communication system, are a subset of equally-spaced tones in the tone set $f_1, f_2, \ldots, f_F$. Therefore, $f_{i(k)}=f_0+(k-1)L\Delta$, for k=1, ..., M, and L is a positive integer number representing the spacing between two adjacent allocated frequency tones. When L=1, this implementation is equivalent to the implementation technique described in FIGS. 4A-4C. For the sake of description, let $f_0=0$. The construction for the other cases where $f_0 \neq 0$ can be similarly obtained.

In this case where the allocated tones are equally-spaced tones, the constructed continuous function CF(t) is identical in each of the L time intervals, [0,T/L], [T/L, 2T/L], ..., and [(L−1)T/L, T/L]. As part of this technique, symbols $C_1, \ldots, C_M$ 16 are mapped to the following time instants $t_k=(k-1)T/M/L$, for k=1, ..., M. In this implementation, the prescribed time instants $t_1, \ldots, t_M$ are equally-spaced time instants uniformly distributed over a fraction (1/L) of the symbol duration 70. As a comparison, in the case of allocated contiguous tones (FIG. 4A), the prescribed time instants are equally-spaced and distributed over the entire symbol duration, as discussed with respect to FIG. 4A.

The procedure for obtaining the digital signal samples S 22 described in FIG. 4A can also be applied with respect to FIG. 5A. More specifically, the digital signal sample vector S is the product of matrix Z (defining the discrete interpolation functions) and the symbol vector C. Given the choice of the allocated frequency tones and prescribed time instants, the matrix Z, which is used to generate the digital signal samples 22 from the discrete signal of mapped symbols, can be simplified to the same formula as in FIG. 4A with the only change in the definition off $f_{i(1)}, f_{i(2)}, \ldots, f_{i(M)}$ and $t_1, \ldots, t_M$.

Figure 5C:
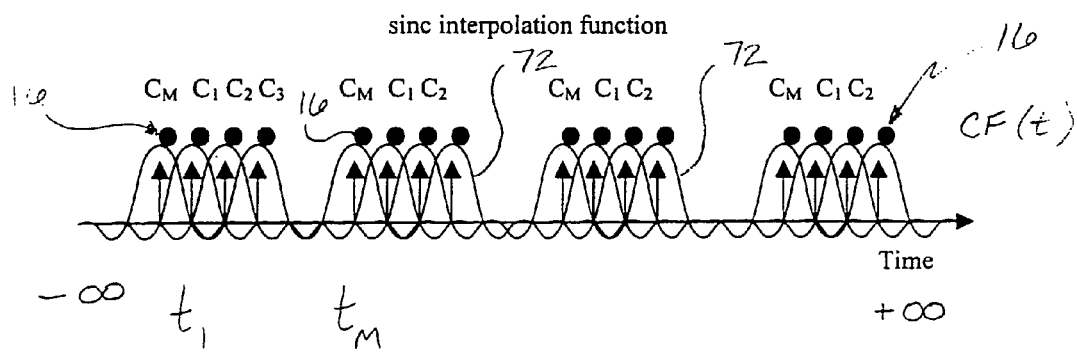
FIG. 5C is a graph showing the mapping of the symbols to the prescribed time instants, the expansion of the mapped symbols, and the use of a sinc function to interpolate the symbols.
Figure 5B:
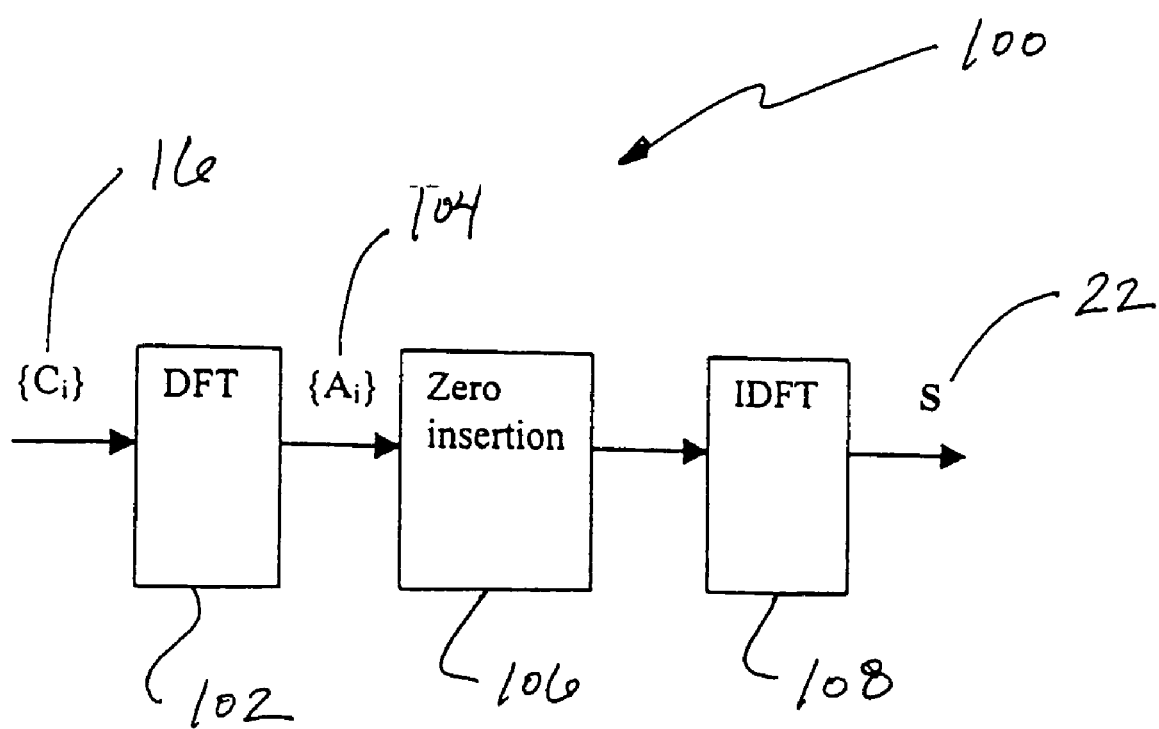
FIG. 5B is a block diagram showing a communication system for producing a digital signal sample vector in the case where the allocated frequency tones are equally spaced.

In FIG. 5B, the procedure of obtaining the digital signal sample vector S 22 described in FIG. 4B can also be applied to the case of allocated frequency tones that are equally spaced tones. More specifically, a digital processing system 100 provides another technique for obtaining the vector of digital signal samples S. A DFT circuit 102 receives a discrete signal of complex data symbols $C_i$ and calculates the frequency responses $A_1, \ldots, A_M$, at tones $f_{i(1)}, f_{i(2)}, \ldots, f_{i(M)}$, through an M-point discrete Fourier transform (DFT). The vector $[A_1, \ldots, A_M]$ 104 output by the DFT circuit 102 is then expanded to a new vector of length N (the total number of time instants in the digital signal sample vector S) by zero insertion at block 106. More specifically, this process involves putting the $k^{th}$ symbol $A_k$ to the i(k)th element of the new vector, for k=1, ..., M, where $f_{i(k)}$ is the $k^{th}$ tone allocated to the transmitter, and inserting zeros in all the remaining elements. Finally, an IDFT circuit 108 performs an N-point inverse discrete Fourier transform on the resulting vector (after zero insertion) to obtain the time domain digital signal sample vector S. The collective procedure of DFT, zero insertion and IDFT is one way of implementing the discrete interpolation functions.

FIG. 5C is the counterpart of FIG. 4C, where symbols $C_1, \ldots, C_M$ are first mapped to $t_1, \ldots, t_M$ respectively over a fraction (1/L) of the symbol duration 70. The symbol mapping is also performed in the time domain. Next the mapped symbols $C_1, \ldots, C_M$ are leftwards and rightwards shifted and replicated to an expanded set of prescribed time instants from −∞ to +∞ which creates an infinite series of symbols. The continuous function CF(t) is then constructed by interpolating the infinite series of mapped symbols with a sinc interpolation function 72. Thus, the continuous function CF(t) includes the digital signal samples mapped to the prescribed time instants as well as digital sample points between the prescribed time instants. Mathematically, the above steps construct the continuous function as $$CF(t) = \sum_{i=1}^{M} \left\{ C_i \sum_{k=-\infty}^{\infty} \mathrm{sinc}\left(t - t_i - kT\frac{1}{L}, \frac{T}{M}\frac{1}{L}\right) \right\}.$$

With continued reference to FIG. 5C, each sinc interpolation function 72 is narrower and therefore decays faster than the sinc interpolation function 60 shown in FIG. 4C. The sinc interpolation function 72 can also be precomputed and stored in the interpolation function memory 23 for use by the interpolation function module 21. The digital sample vector S 22 can be obtained in the same technique shown in FIG. 4C. In FIGS. 5A and 5C, if N is a multiple of ML, then $S_{1+(k-1)N/M/L+(j-1)N/L}=C_k$, for k=1, ..., M, and j=1, ..., L. The discrete interpolation functions, which combine the continuous interpolation functions and the sampling function, can be derived easily from the above description.

FIG. 5D illustrates the resulting small signal variation and low peak-to-average ratio of the digital signal sample vector S 74 associated with the transmitted OFDM signal 76. As will be appreciated by comparing FIGS. 4D and 5D, mapping the constellation of complex symbols 16 in the time domain produces an OFDM signal 76 having a significantly lower peak-to-average ratio.

Figure 6:
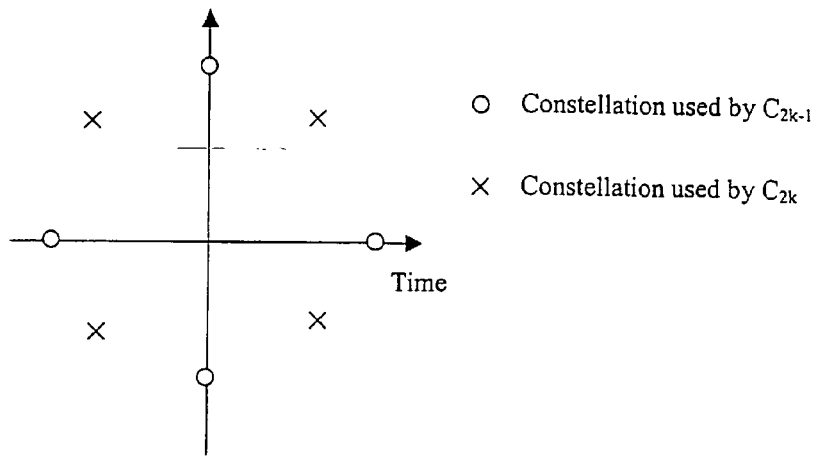
FIG. 6 is a graph showing π/4 symbol rotation.

Referring now to FIG. 6, a π/4 symbol rotation technique is used to further reduce the peak-to-average ratio of the transmitted OFDM signal. At an OFDM symbol duration, if symbols $B_1, \ldots, B_M$ of the constellation are to be transmitted, symbols $B_1, \ldots, B_M$ are mapped to another block of complex symbols $C_1, \ldots, C_M$, where each odd number symbol remains unchanged and each even number symbol is phase rotated by π/4. For example, if symbols $B_1, \ldots, B_M$ belong to a QPSK constellation {0, π/2, π, π3/2}, the odd number symbols $C_k$ still belong to the same QPSK constellation, while after being phase rotated the even number symbols $C_k$ belong to another QPSK constellation {π/4, π3/4, π5/4, π7/4}. Symbols $C_1, \ldots, C_M$ are then used to construct the digital signal samples 22 in the time domain as described above with respect to FIGS. 3A-5C.

Figure 7:
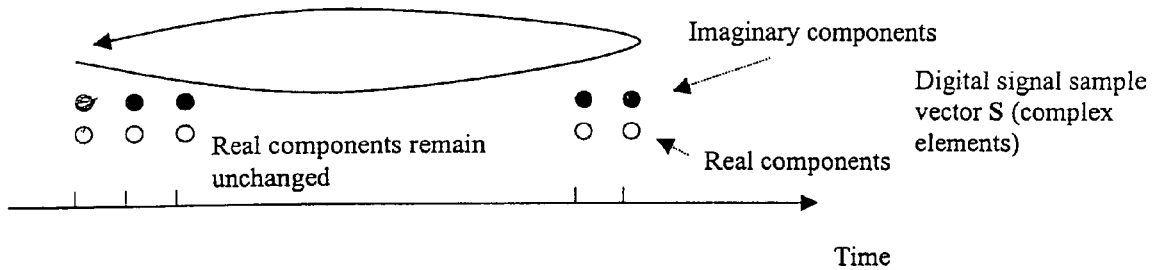
FIG. 7 shows the use of a cyclic shift of the real and imaginary signal components.
Figure 7:
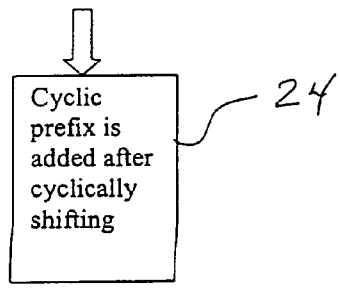

With reference to FIG. 7, another technique for reducing the peak-to-average ratio is shown, which introduces a cyclic offset of the real and imaginary signal components. This technique involves a first step of offsetting the imaginary components of the digital signal samples S 22, which have been generated using the technique of FIGS. 3A-5C, by an integer number of samples. If necessary, the technique then involves a second step of adjusting the timing by a fraction of a sample period between the real and the imaginary signal components in the transmit path.

At an OFDM symbol duration, if the digital signal samples $S_1, S_2, \ldots, S_N$ have been obtained using the method as described in FIGS. 3A-5C, the digital signal sample vector S is then mapped to another vector S' as follows. The real component of digital signal sample $S'_k$ is equal to that of digital signal sample $S_k$. The imaginary component of digital signal sample $S=_k$ is equal to that of digital signal sample $S_j$ where index j=(k+d−1)mod N+1, for k=1, ..., N, with mod representing a module operation. The parameter d is an integer representing the cyclic offset, in terms of number of samples, between the real and imaginary components.

In one implementation, the value of d is determined by $$\frac{N}{2LM},$$

where L is discussed in FIG. 5A. In one aspect of this technique, d is chosen to be close to $$\frac{N}{2LM}.$$

For example, d can be the integer closest to $$\frac{N}{2LM},$$

the largest integer not greater than $$\frac{N}{2LM},$$

or the smallest integer not smaller than $$\frac{N}{2LM}.$$

In one example, d is chosen to be the largest integer not greater than $$\frac{N}{2LM}.$$

This example can be easily extended for other choices of d.

The digital signal sample vector S' is then passed to the cyclic prefix prepender circuit 24, as shown in FIG. 1. Therefore, the operation of half symbol cyclic shifting is carried out before the operation of prepending the cyclic prefix, such as that performed by the cyclic prefix circuit 24 of FIG. 1.

Not specifically shown in FIG. 7, when or after the sample vector S' and the cyclic prefix are outputted to the digital to analog converter 28, the imaginary components are further delayed by an amount of $$\left(\frac{N}{2LM} - d\right)\frac{T}{N},$$

which is a fraction of a sample period T/N.

As a variation of the technique shown in FIG. 7 (not specifically shown), another technique for achieving a similar result can be used to eliminate the second step of adjusting timing by a fraction of a sample period between the real and the imaginary signal components in the transmit path. As part of this technique, the real and the imaginary components of the desired digital signal samples S 22 are generated separately as described by the following.

A first series of digital signal samples 22 are generated using the technique of FIGS. 3A-5C. The real components of the desired digital signal samples 22 are equal to those of the first series of samples. A second series of digital signal samples 22 are generated using the technique of FIGS. 3A-5C except for the following changes. The imaginary components of the desired digital signal samples are equal to those of the second series of samples. In the general method described in FIGS. 3, 4A, and 5A, the matrix $$\begin{bmatrix} e^{j2\pi f_{i(1)}0} & \cdots & e^{j2\pi f_{i(M)}0} \\ \vdots & & \vdots \\ e^{j2\pi f_{i(1)}T\frac{N-1}{N}} & \cdots & e^{j2\pi f_{i(M)}T\frac{N-1}{N}} \end{bmatrix}$$

is changed to $$\begin{bmatrix} e^{j2\pi f_{i(1)}(0-\frac{T}{2LM})} & \cdots & e^{j2\pi f_{i(M)}(0-\frac{T}{2LM})} \\ \vdots & & \vdots \\ e^{j2\pi f_{i(1)}(T\frac{N-1}{N}-\frac{T}{2LM})} & \cdots & e^{j2\pi f_{i(M)}(T\frac{N-1}{N}-\frac{T}{2LM})} \end{bmatrix}.$$

In the block diagram method described with regard to FIG. 4B, an additional operation is required after zero insertion (block 56) and before N-point IDFT (block 58), where each element k in the expanded length N vector is phase rotated by $$e^{-j2\pi f_k \frac{T}{2LM}}.$$

Referring to FIGS. 8A-8D, another technique for further reducing the peak-to-average ratio is implemented by allocating more frequency tones than the number of complex symbols to be transmitted in a symbol duration 40. In FIGS. 3-7, the number of tones allocated to the transmitter associated with the communication system is equal to the number of symbols to be transmitted in a given OFDM symbol duration.

Compared with the other techniques described with respect to the previous figures, the technique of FIGS. 8A-8D requires additional overhead of bandwidth to transmit the same number of complex symbols.

For example, if the communication system 10 is allocated $M+M_{ex}$ contiguous frequency tones, $f_{i(1)}, f_{i(2)}, \ldots, f_{i(M+Mex)}$, and M symbols $C_1, \ldots, C_M$ of the constellation are to be transmitted at an OFDM symbol duration, from the comparison of FIGS. 4A and 5A, the case of allocated contiguous tones can be easily extended to the case of allocated equally-spaced tones. As part of this implementation of the OFDM communication system 10, $M_{ex}$ is a positive number representing the number of excess tones to be used and is assumed to be an even number. Therefore, the allocated tone $$f_{i(k)} = f_0 + \left(k - \frac{M_{ex}}{2} - 1\right)\Delta,$$

for k=1, ..., $M+M_{ex}$. For purposes of description, let $f_0=0$. The construction for the other cases where $f_0 \neq 0$ can be similarly obtained.

As with the technique described with respect to FIG. 4A, the prescribed time instants are $t_k=(k-1)T/M$, for k=1, ..., M, that is, the prescribed time instants $t_1, \ldots, t_M$ are equally-spaced time instants in the symbol duration 40.

Figure 8B:
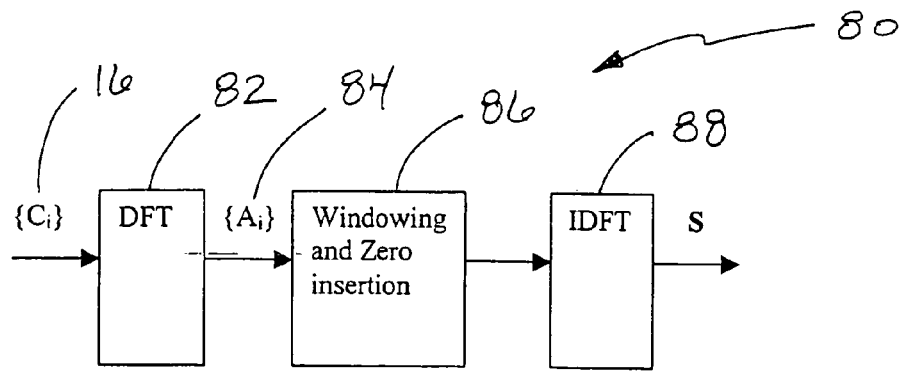
FIG. 8B is a block diagram showing a technique using more tones than the number of symbols to be transmitted for producing a digital signal sample vector.
Figure 8A:
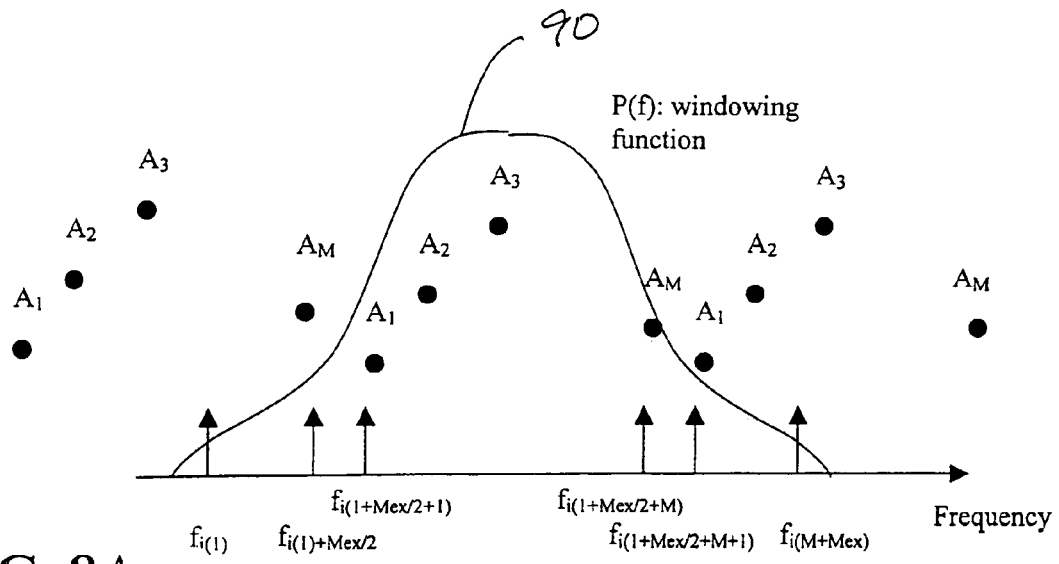
FIG. 8A is a graph showing application of a windowing function in the frequency domain to further reduce the peak-to-average ratio.

As part of this technique shown in FIG. 8A, P(f) is a smooth windowing function 90 in the frequency domain, which is non-zero only over interval $[f_{i(1)}, f_{i(M+Mex)}]$. In addition, P(f) 90 also satisfies the Nyquist zero intersymbol interference criterion, i.e., $$\sum_{k=-\infty}^{\infty} P(f - kM\Delta) = 1$$

for any frequency f, where $\Delta$ is the spacing between adjacent tones.

FIG. 8B shows the block diagram of the technique. As described above, a symbol-to-symbol mapping is optionally performed to generate a discrete signal of mapped complex symbols $C_1, \ldots, C_M$, 16. The frequency responses $A_1, \ldots, A_M$, 84 are calculated through an M-point discrete Fourier transform (DFT) of the complex symbols 16 at block 82. At block 86, vector $[A_1, \ldots, A_M]$ 84 is cyclically expanded to a new vector A' of length N and windowed with a windowing function 90 as follows:

$$A'_k = A_{g(k)} * P((k-1)\Delta + f_1)$$

where index g(k)=mod(k-i(1)-$M_{ex}$/2, M)+1, for k=1, ..., N.

At block 88, the digital signal sample vector S is obtained by taking an N-point inverse discrete Fourier transform (IDFT) of the new vector A'. Finally, the cyclic prefix is added by cyclic prefix circuit 24 as described above with regard to FIG. 1.

Figure 8C:
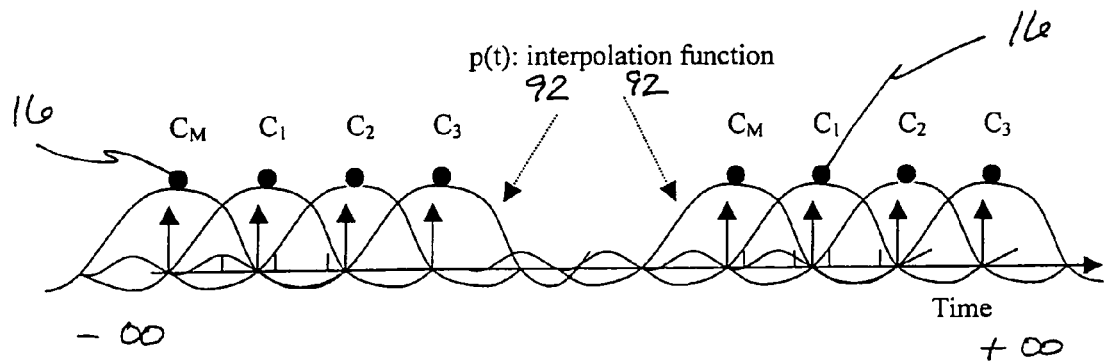
FIG. 8C is a graph showing the use of an interpolation function corresponding to the window function of FIG. 8B to the symbols mapped to the prescribed time instants.

To provide additional insight to the above signal construction technique, assume that the allocated tones $f_{i(1)}, f_{i(2)}, \ldots, f_{i(M+Mex)}$ are centered at frequency 0. In FIG. 8C (as with FIG. 4C), symbols $C_1, \ldots, C_M$ are first mapped to equally-spaced time instants in the symbol duration 40, and are then leftwards and rightwards shifted and replicated from $-\infty$ to $+\infty$. What is different from FIG. 4C is that a different interpolation function 92, which is determined by the windowing function 90, is used to generate the continuous function, $$CF(t) = \sum_{i=1}^{M} C_i \sum_{k=-\infty}^{\infty} p(t - t_i - kT)$$

where p(t) 92 is the time domain response of P(f) 90. As with FIG. 4C, the digital signal samples are obtained by letting t=0, T/N, ..., T(N−1)/N.

In one exemplary aspect of this technique, if a raised cosine windowing function is used, i.e., $$P(f) = \begin{cases} \dfrac{T}{M} & \text{if} & |f| < (1-\beta)\dfrac{M}{2T} \\ \dfrac{T}{2M}\left\{1 + \cos\left[\dfrac{\pi T}{\beta M}\left(|f| - \dfrac{(1-\beta)M}{2T}\right)\right]\right\} & \text{if} & (1-\beta)\dfrac{M}{2T} \leq |f| \leq (1+\beta)\dfrac{M}{2T} \\ 0 & \text{if} & |f| > (1+\beta)\dfrac{M}{2T} \end{cases}$$

where $\beta=(M_{ex}+2)/M$ represents the percentage of excess tone overhead, then, the interpolation function p(t) 92 is given by $$\overline{p(t)} = \frac{\sin(\pi tM/T)}{\pi tM/T} \frac{\cos(\pi \beta tM/T)}{1 - 4\beta^2 t^2 M^2/T^2}.$$

As $\beta$ increases, the interpolation function p(t) 92 decays faster, thereby reducing the probability of having large peak at samples between $t_i$.

Figure 8D:
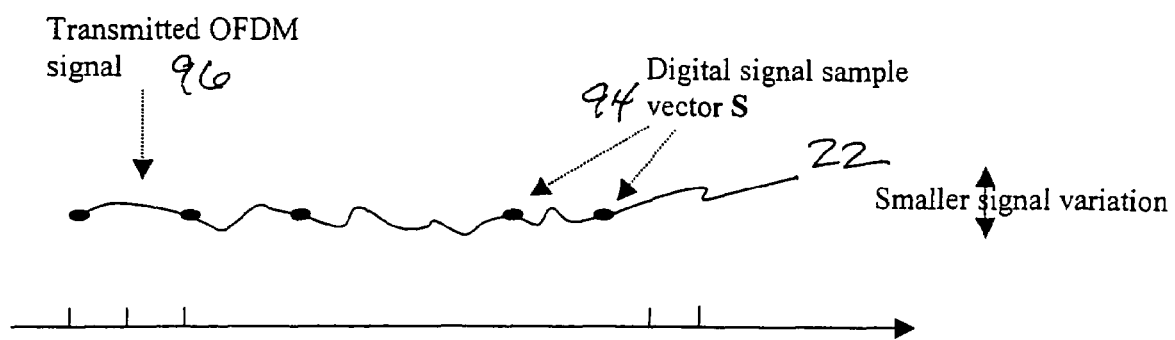
FIG. 8D is a graph showing the reduced peak-to-average ratio of the resulting digital signal sample vector when the symbols are mapped in the time domain using the technique of FIGS. 8A-8C.

FIG. 8D shows the resulting small signal variation and low peak-to-average ratio of the digital signal sample vector S 94 associated with the transmitted OFDM signal 96. As will be appreciated, mapping the constellation symbols 16 in the time domain produces an OFDM signal 96 having a significantly lower peak-to-average signal ratio.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for generating a vector of digital signal samples (S), the apparatus comprising:
   a processor; and
   a memory coupled to the processor, the memory including a set of instructions stored therein and executable by the processor to
   receive a discrete signal of complex data symbols (C), calculate frequency responses ($A_1, \ldots A_M$) corresponding to tones ($f_{(1)}, \ldots f_{(M)}$), though an M-point DFT, and output a vector of length M;
   expand the vector to a new vector of length N, and insert zero-value symbols corresponding to tones other than tones allocated to a transmitter; and
   perform an N-point inverse discrete Fourier transform operation on the new vector after zero insertion to obtain the vector of digital signal samples (S), and generate a low peak-to-average OFDM-based signal using the vector of digital signal samples (S) for transmission.

2. The apparatus of claim 1, wherein the tones ($f_{(1)}, \ldots f_{(M)}$) are allocated tones available for transmission.

3. The apparatus of claim 1, wherein the allocated tones are contiguous.

4. The apparatus of claim 1, wherein the vector of length N is larger than the vector of length M.

5. The apparatus of claim 1, wherein the allocated tones are equally spaced.

6. The apparatus of claim 2, wherein the allocated tones are contiguous.

7. The apparatus of claim 2, wherein the vector of length N is larger than the vector of length M.

8. The apparatus of claim 2, wherein the allocated tones are equally spaced.

9. The apparatus of claim 5, wherein the allocated tones are contiguous.

10. The apparatus of claim 5, wherein the vector of length N is larger than the vector of length M.

11. The apparatus of claim 9, wherein the vector of length N is larger than the vector of length M.

12. The apparatus of claim 6, wherein the vector of length N is larger than the vector of length M.

13. The apparatus of claim 12, wherein the allocated tones are equally spaced.

14. The apparatus of claim 7, wherein the allocated tones are equally spaced.

15. The apparatus of claim 7, wherein the allocated tones are contiguous.

16. The apparatus of claim 8, wherein the allocated tones are contiguous.

17. An apparatus for generating a vector of digital signal samples (S), the apparatus comprising:

a processor and at least one hardware module coupled to the processor and configured to receive a discrete signal of complex data symbols (C), calculate frequency responses ($A_1, \ldots A_M$) corresponding to tones ($f_{(1)}, \ldots f_{(M)}$, through an M-point DFT, and output a vector of length M; p1 expand the vector to a new vector of length N, and insert zero-value symbols corresponding to tones other than tones allocated to a transmitter; and perform an N-point inverse discrete Fourier transform operation on the new vector after zero insertion to obtain the vector of digital signal samples (S), and generate a low peak-to-average OFDM-based signal using the vector of digital signal samples (S) for transmission.

18. The apparatus of claim 17, wherein the tones ($f_{(1)}, \ldots f_{(M)}$) are allocated tones available for transmission.

19. The apparatus of claim 17, wherein the allocated tones are contiguous.

20. The apparatus of claim 17, wherein the vector of length N is larger than the vector of length M.

21. The apparatus of claim 17, wherein the allocated tones are equally spaced.

22. The apparatus of claim 18, wherein the allocated tones are contiguous.

23. The apparatus of claim 18, wherein vector of length N is larger than the vector of length M.

24. The apparatus of claim 18, wherein the allocated tones are equally spaced.

25. The apparatus of claim 21, wherein the allocated tones are contiguous.

26. The apparatus of claim 21, wherein the vector of length N is larger than the vector of length M.

27. The apparatus of claim 25, wherein the vector of length N is larger than the vector of length M.

28. The apparatus of claim 22, wherein the vector of length N is larger than the vector of length M.

29. The apparatus of claim 28, wherein the allocated tones are equally spaced.

30. The apparatus of claim 23, wherein the allocated tones are equally spaced.

31. The apparatus of claim 23, wherein the allocated tones are contiguous.

32. The apparatus of claim 24, wherein the allocated tones are contiguous.

* * * * *

UNITED STATES PATENT AND TRADEMARK OFFICE
CERTIFICATE OF CORRECTION

PATENT NO. : 7,623,442 B2
APPLICATION NO. : 11/186490
DATED : November 24, 2009
INVENTOR(S) : Rajiv Laroia, Junyi Li and Sathyadev Venkata Uppala It is certified that error appears in the above-identified patent and that said Letters Patent is hereby corrected as shown below:

On page 22, column 14, Claim 1, line 56, "though", should be, --through--

On page 23, column 15, Claim 17, line 39, "p1", should be deleted.

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO.       : 7,623,442 B2  Page 1 of 1
APPLICATION NO.  : 11/186490
DATED            : November 24, 2009
INVENTOR(S)      : Laroia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Fourteenth Day of December, 2010

David J. Kappos
*Director of the United States Patent and Trademark Office*